(No Model.)

F. H. CHASE.
ANTIFRICTION BEARING.

No. 497,764. Patented May 23, 1893.

WITNESSES
J. M. Hartnett
L. H. Smith

INVENTOR
Frank H. Chase
By his Atty
Henry Williams

UNITED STATES PATENT OFFICE.

FRANK H. CHASE, OF GRAND RIVERS, KENTUCKY, ASSIGNOR OF ONE-HALF TO JAMES L. HALL, OF KINGSTON, MASSACHUSETTS.

ANTIFRICTION-BEARING.

SPECIFICATION forming part of Letters Patent No. 497,764, dated May 23, 1893.

Application filed October 1, 1892. Serial No. 447,466. (No model.)

*To all whom it may concern:*

Be it known that I, FRANK H. CHASE, a citizen of the United States, residing at Grand Rivers, in the county of Livingston and State of Kentucky, have invented a new and useful Improvement in Antifriction-Bearings, of which the following is a specification.

This invention relates to that class of antifriction bearings known as ball-bearings, and it consists in the construction below described and illustrated in the accompanying drawings, wherein the bearing surfaces with which the balls are in contact are, at the point of such contact, convex in shape.

Figure 1:
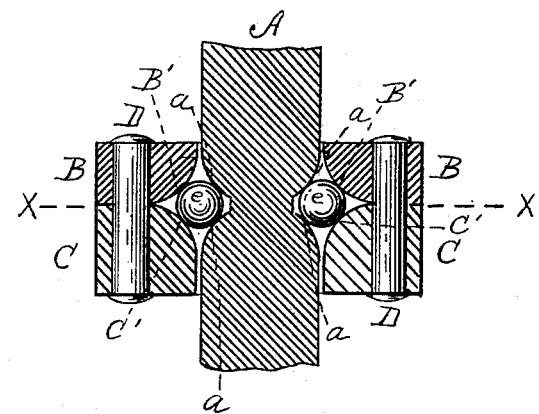
Figure 2:
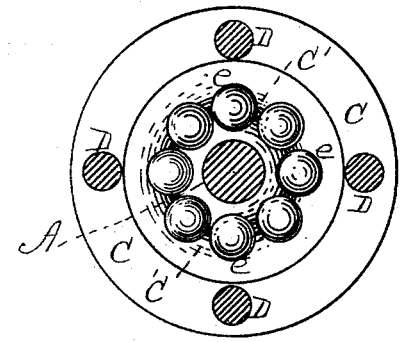

In the drawings, Figure 1 is a section of a ball-bearing embodying my invention. Fig. 2 is a section taken on line $x$ Fig. 1.

Similar letters of reference indicate like parts.

A represents a shaft and B C two rings united by rivets D, or equivalent devices, and constituting a box or case. The shaft A may revolve within the stationary box B C, or, the box B C may revolve on the stationary shaft A, as desired. The shaft and the box are not in contact with each other at any point and are separated by the row of balls $e$. Each ball comes in contact with the shaft at two points, and with each of the rings B and C at one point, and all these bearing surfaces, viz., the surfaces $a$ on the shaft and B' C' on the rings B C constituting the box, are convex in section as shown in Fig. 1. It will thus be seen that the bearing surfaces of the balls, shaft and box consist of opposite convexities, and hence the points of contact are exceedingly small, and the friction correspondingly slight. Moreover, as the bearing begins to wear at the points of contact, the wearing portions must be first flattened before they become grooved or concave, the latter shape increasing the friction and being the shape I wish to avoid, although it is perhaps the most common shape in a ball bearing.

The degree of convexity or curvature of the bearing surfaces may be varied as desired.

Having thus fully described my invention, what I claim, and desire to secure by Letters Patent, is—

1. A ball-bearing consisting essentially of a shaft as A provided with the opposite convex bearing surfaces $a$ for the balls, a box as B C provided internally with the opposite convex bearing surfaces B' and C' for the balls, and a series of balls intermediate said box and shaft, substantially as set forth.

2. A ball-bearing consisting essentially of a shaft as A provided with the opposite convex bearing surfaces $a$ for the balls, the ring B provided with the internal convex surface B', the ring C provided with the internal convex surface C', said rings being secured together, and a series of balls intermediate with said rings and shaft, substantially as described.

FRANK H. CHASE.

Witnesses:
 HENRY W. WILLIAMS,
 J. M. HARTNETT.